(12) United States Patent
Layne et al.

(10) Patent No.: US 6,202,834 B1
(45) Date of Patent: Mar. 20, 2001

(54) MODULAR LINK CONVEYOR WITH I-BEAM GUIDE RAIL

(75) Inventors: James L. Layne, Bowling Green; Michael D. McDaniel; Mark T. Johnson, both of Glasgow; Wendell S. Bell, Smiths Grove, all of KY (US)

(73) Assignee: Span Tech LLC, Glasgow, KY (US)

( * ) Notice: Subject to any disclaimer, the term of this patent is extended or adjusted under 35 U.S.C. 154(b) by 0 days.

(21) Appl. No.: 09/033,572

(22) Filed: Mar. 3, 1998

(51) Int. Cl.$^7$ .................................................. B65G 17/06
(52) U.S. Cl. ............................................. 198/852; 198/841
(58) Field of Search ................................. 198/852, 841, 198/834, 853, 851

(56) References Cited

U.S. PATENT DOCUMENTS

| | | |
|---|---|---|
| 1,965,285 | 7/1934 | Gilstad . |
| 2,126,274 * | 4/1938 | Noffsinger et al. .................. 198/853 |
| 2,297,813 | 10/1942 | Stork . |
| 3,513,965 * | 5/1970 | Miller .................................. 198/853 |
| 3,788,447 | 1/1974 | Stephanoff . |
| 3,881,593 | 5/1975 | Mushovic et al. . |
| 4,222,478 | 9/1980 | Gasser . |
| 4,222,483 * | 9/1980 | Wootton et al. ..................... 198/841 |
| 4,436,200 | 3/1984 | Hodlewsky et al. . |
| 4,886,158 * | 12/1989 | Lapeyre ............................... 198/834 |
| 4,953,693 | 9/1990 | Draebel . |
| 5,031,757 | 7/1991 | Draebel et al. . |
| 5,105,936 * | 4/1992 | Stapper et al. ....................... 198/834 |
| 5,127,515 | 7/1992 | Damkjaer . |
| 5,178,263 | 1/1993 | Kempen . |
| 5,375,697 * | 12/1994 | Battati et al. ........................ 198/852 |
| 5,469,958 * | 11/1995 | Gruettner et al. ................... 198/834 |
| 5,620,084 * | 4/1997 | Mensch ............................... 198/834 |

* cited by examiner

Primary Examiner—Christopher P. Ellis
Assistant Examiner—Joe Dillon, Jr.
(74) Attorney, Agent, or Firm—King and Schickli PLLC

(57) ABSTRACT

A conveyor system has an upstanding integral I-beam guide rail of extruded plastic for use with a narrow width chain conveyor belt. The belt is formed from a series of modular links interconnected through an apex and spaced legs. The legs terminate in foot portions having inwardly projecting guide tabs for slidingly engaging integral outwardly extending upper and lower guide tracks of the guide rail. Each link may be provided with wings which serving to increase the conveying surface area. Split sprockets for engaging the narrow chain belt are releasably secured to the drive/idler shafts. Releasable end guide components, including a support plate and a split bushing, provide both a support and a bearing surface for these shafts. The I-beam may include separate extruded plastic guide tracks spaced and clamped in position by a series of clamping assemblies. A series of narrow chain belts positioned in a spaced relationship and driven by a single shaft provide multiple lane product flow. Bends or curves formed in the guide rail also allow for merging or separating flow.

14 Claims, 5 Drawing Sheets

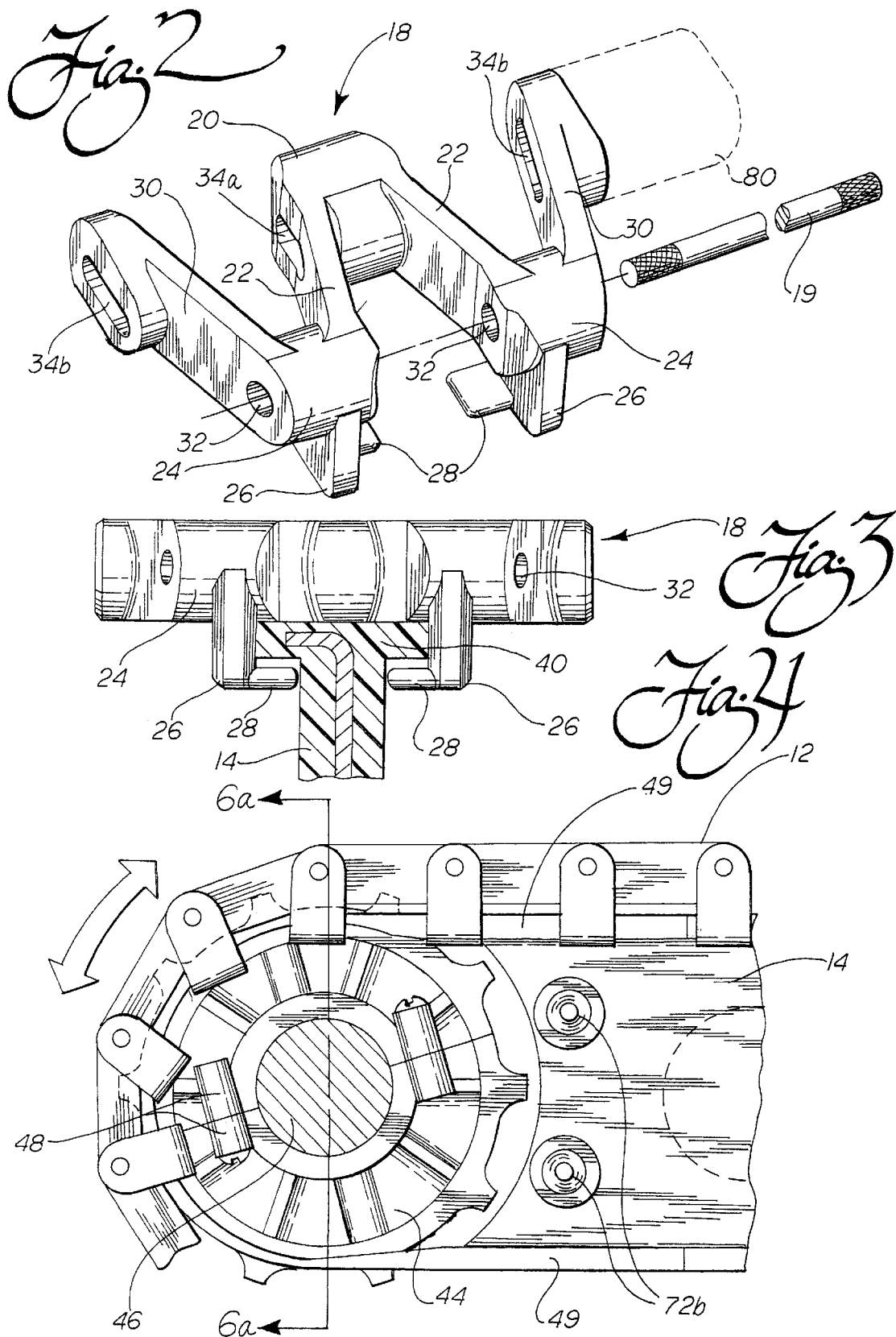

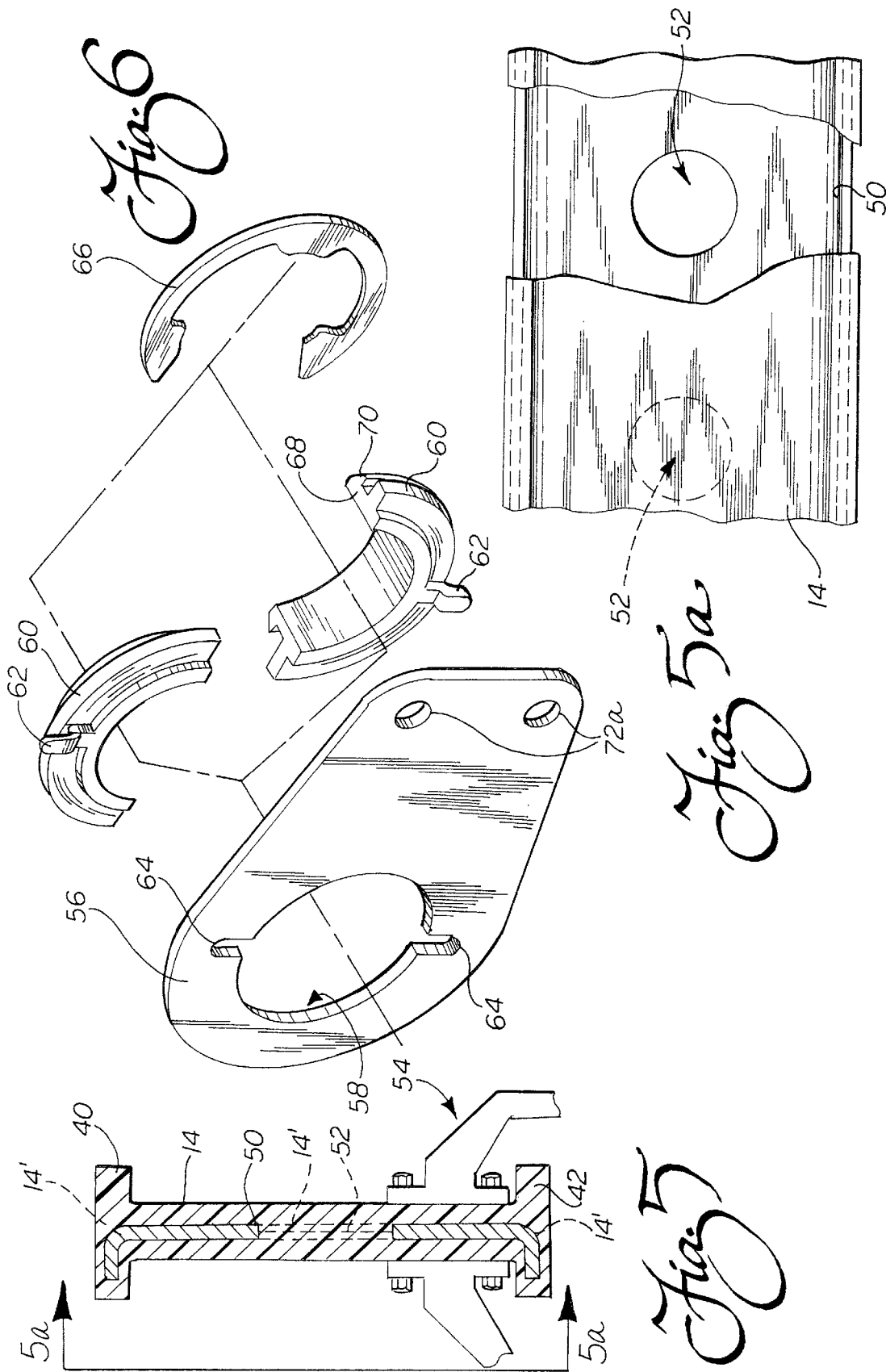

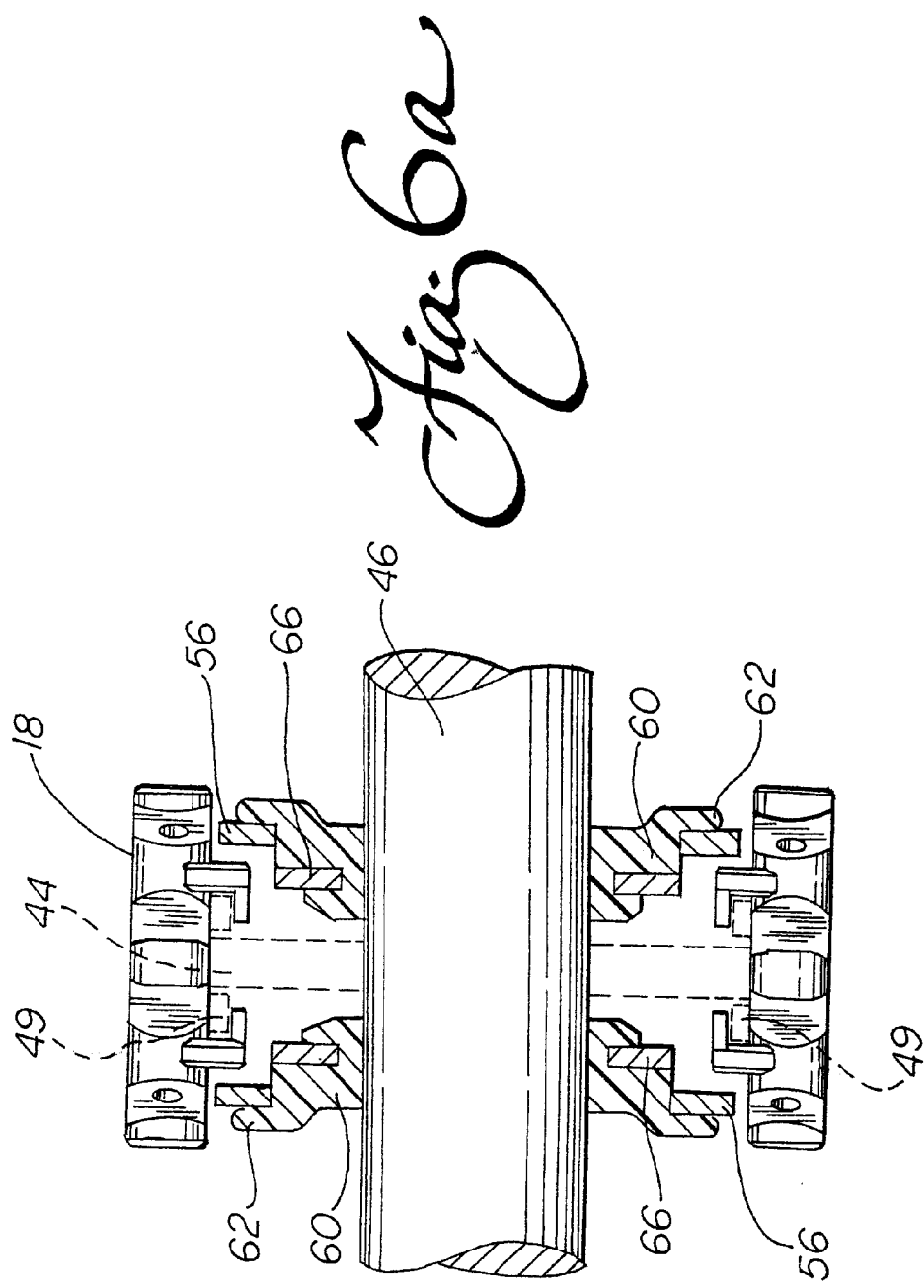

MODULAR LINK CONVEYOR WITH I-BEAM GUIDE RAIL

TECHNICAL FIELD

The present invention relates generally to conveyor systems and, more particularly, to a modular link conveyor system having an improved guide rail for use with a narrow chain conveyor belt.

BACKGROUND OF THE INVENTION

Conveyor systems are an integral part of most modern production facilities. Such systems are especially beneficial in food processing, product manufacturing, and other areas where flow between different manufacturing stations is critical in providing an efficient and economical operation. Recent improvements in the simplicity of design and speed of operation provide greatly improved product flow and transfer, thereby significantly reducing production costs and maximizing profitability.

It is, of course, desirable for the system to occupy as little area as possible. In addition to the obvious constraint created by a limitation in the available floor space, reductions in system dimensions also allow more work stations to be provided in a given area for greater operator efficiency. These factors represent a significant cost savings and greatly increase production efficiency. Additionally, many production/manufacturing operations for small products, such as food items, require separation from a relatively wide in-feed conveyor into spaced, single lanes, or vice versa. The use of multiple, relatively narrow conveyors to provide the desired multiple lane flow is thus advantageous.

The broad concept of a compact conveyor system utilizing a relatively narrow belt on a simple guide rail is acknowledged to be known in the prior art. An example of one such proposal is illustrated in U.S. Pat. No. 5,178,263 to Kempen, which teaches the use of an H-shaped rail having upper and lower inner channels for guiding a single link wide belt. Although relatively compact, one significant disadvantage of such a design is that fine debris and/or product residue are easily trapped within the inner channels. Moreover, the closed sides prevent cleaning solutions from being reliably distributed within the channels and then released as run-off for disposal. Thus, thoroughly cleaning the system requires the removal of the belt, thereby significantly increasing production downtime and further escalating the cost of operation.

In addition to narrowing the conveyor belt, space savings may also be achieved by optimizing the system layout. This may include placing narrow belts between production machines or providing bends, curves, or inclines. Of course, a narrow belt must smoothly and efficiently traverse these different geometries.

Recognizing the need for a compact conveyor system having such improved features, Applicant's U.S. Pat. No. 5,031,757 to Draebel et al. discloses a narrow chain conveyor belt formed of a single row of interconnected modular links. A pair of upstanding spaced rails provide forward and return runs that serve to guide the belt in an endless path. This design provides for the first time the desirable compactness for space savings and the open design which facilitates cleaning. However, it has been discovered that it is possible to provide an even narrower belt and conveyor system for even greater savings and efficiency, while retaining the characteristic smooth and efficient operation, especially around curves or bends.

As briefly mentioned above, multiple laning of product is a key requirement in many production systems. First, small products require only a narrow width belt, so that any additional width provided is simply a waste of operating capital. Also, the narrow conveyors clearly cost less to run. Further, some bakery products, such as saltine crackers and the like, are very adaptable to being shingled on a narrow conveyor having static guide rails placed to the sides. The increase in production provided by this type of system results in an even more significant cost savings.

Accordingly, a need is identified for a conveyor system having an improved narrow width chain conveyor belt and improved guide means. The system would be compact in nature to provide the desired space savings, while also maximizing product transport capabilities. In addition, the system would incorporate the ability to provide serial and/or shingled product flow along a single belt or a series of spaced belts. Further, an integral, open design belt and guide rail would be provided to facilitate cleaning, and releasable end guide components would improve ease of maintenance.

SUMMARY OF THE INVENTION

Therefore, with the aforementioned needs in focus, it is a primary object of the present invention to provide an improved modular link conveyor system of narrow width.

Another object of the present invention is to provide a conveyor system having an I-beam guide rail having integral outwardly extending upper and lower guide tracks for guiding a narrow width chain conveyor belt.

Still another object of the present invention is to provide a conveyor system with an improved narrow width modular link belt that is particularly adapted to convey small products.

Yet another object of the present invention is to provide a conveyor system that is especially adapted for food processing, the system having an open design to facilitate cleaning, and releasable end guide components to simplify adjustment.

An additional object of the present invention is to provide a conveyor system wherein a series of coaxially mounted narrow width chain conveyor belts provide multiple lane product flow to or from a single, relatively wide conveyor.

Still a further object of the present invention is to provide a conveyor system and individual narrow width conveyor belt that is relatively simple and inexpensive to manufacture, install and maintain.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a modular link conveyor system utilizing an improved guide rail having integral guide tracks and a narrow width chain is provided. The conveyor system is especially beneficial in operations requiring reduced space to transport product between successive work stations, such as in food processing operations.

The conveyor belt includes a plurality of interconnected modular links. Advantageously, a single integral link defines the width of the belt. Each link has an apex portion and a pair of leg portions extending therefrom. The leg portions terminate in bulb-like foot portions.

The foot portions include corresponding transverse holes for receiving a cross rod which serves to interconnect the links. The apex portion includes a centrally-located transverse slot. Each cross rod joins the foot portions of a leading link with the apex portion of a trailing link, thereby forming the endless, interlocking conveyor belt. Preferably, the cross rod is knurled at the locations where it passes through the foot portions and is force fit therein to ensure a secure, semi-permanent engagement with the link. The rod is ideally flush with the outside edge of each foot portion, thereby preventing the formation of a blind cavity wherein debris or residue can accumulate. However, the rod may extend outwardly from the hole to provide additional width and stability to the belt, as is described in more detail below.

As can be appreciated, the transverse slot in the apex portion allows the cross rod to shift longitudinally and pivot laterally. Advantageously, this provides the belt with a substantial degree of freedom of motion in two respects. First, the movement of the apex into this space allows the belt to compress across its width. This compression allows the belt to smoothly and efficiently traverse a curve or bend in the conveyor system. Moreover, the side portions of each apex are provided with slanted surfaces, which permit the link to smoothly turn in the direction of the curve without interfering with the surrounding leg portions of a leading link. Second, as the apex of a trailing link is free to rotate about the cross rod, the belt is free to ramp upward or downward as required.

The foot portions of each link further include a pair of depending arms from which guide tabs inwardly project. The depending arms serve to define the peripheral edges of the belt. As is described in more detail below, the depending arms and guide tabs assist in guiding the belt by slidingly engaging integral guide tracks of the I-beam shaped guide rail. The guide tabs also provide the advantageous function of assisting in supporting the belt in an inverted position as it travels along the return run.

In accordance with an important aspect of the present invention, the I-beam shaped guide rail includes integral outwardly extending upper and lower guide tracks that advantageously serve to guide the belt in the forward and return directions, respectively. More particularly, the lateral flanges at the upper and lower ends of the I-beam define the guide tracks. The depending arms of each link engage the sides of the flanges, which thus replace the normal extra wear strips. In the preferred embodiment, the guide rail is extruded plastic cut-to-length, so that the bearing surface provided is continuous. This means that a minimum number of butted joints are required for a particular length conveyor, thus minimizing interstitial spaces where debris or residue can become trapped. Furthermore, the open links allow the bearing surface to be easily cleaned using cleaning solutions and/or high pressure power washing, thus avoiding any significant production downtime.

The lower flanges of the I-beam rail act as a guide for the belt on the return run. As can be appreciated, the inwardly projecting tabs of each link slidingly engage across the lower flanges in the same manner as on the forward run described above. The use of a single guide rail having integral guide tracks thus avoids the need for any additional support structure for the entire endless belt, which thus also serves to reduce system complexity.

In the preferred embodiment, the I-beam guide rail is extruded of a plastic composition having enhanced tribological characteristics, such as UHMW plastic including Nylon 6—6, or the like. If necessary or desired, a C or I-shaped metal reinforcement strip can be embedded in the I-beam during forming. In an alternative embodiment, the I-beam can be formed by merging back-to-back C-shaped plastic channels. Advantageously, either embodiment provides the entire guide rail with the requisite strength and the improved frictional characteristics along its entire surface area. This solid plastic guide rail is effective to increase system efficiency and to substantially reduce wear on the side links of the belt. The reinforcement strip is preferably provided with a series of apertures which allow the plastic material molded to either side of the guide rail to bond together. Horizontal or vertical curves may also be formed during extrusion of the I-beam, thereby allowing a wide variety of degrees of curvature to be provided. Support means, such as spaced leg or pylon supports, may be attached to either side of the web of the I-beam rail.

In an alternative embodiment, the I-beam shaped guide rail includes integral upper and lower guide tracks held together by a series of opposed clamp assemblies. Each respective guide track includes a pair of opposed flanges which provide a guide/bearing surface for the modular links, as described above. A bulbous protrusion extending from each guide track provides a pair of shoulders. The clamp assemblies include opposed brackets contoured to accept the shoulders and attachment means for securing the brackets together. Advantageously, this design allows the vertical spacing between the integral guide rails to be adjusted, while retaining the simplicity, improved operational characteristics, and open design provided in the preferred embodiment. Each bracket may also include means for attaching side rails for the conveyor belt or support means for the guide rail.

In accordance with another important aspect of the invention, the modular links may also be provided with width-extending wings. In a preferred embodiment, the wings extend angularly outwardly from the foot portions. Each wing has a transverse slot which corresponds to the slot in the apex portion. These slots are adapted to accept extensions of the cross rod, if desired, to provide additional lateral stability to the links. As can be appreciated, this arrangement also allows the links to retain the desirable pivotability and compressibility for smoothly negotiating curves.

It should be appreciated that the wings serve to increase the width of the belt to actually extend beyond the side edges of the guide rail. This provides an increased surface area for supporting slightly wider product, while retaining the desired minimum contact area between the links and the guide rail. The links may also be provided with wing extensions, if desired, to further increase to product-retaining surface area.

In accordance with yet another important aspect of the present invention, the conveyor is provided with releasable end guide components that allow for easy maintenance. A split sprocket releasably mounted to the drive/idler shafts is provided at both the drive and idler ends of the endless conveyor, respectively. A split bushing provides a bearing surface for these shafts. The split bushing is secured in an aperture formed in a support plate and retained by an E-shaped retainer clip. The support plate is attached to the end of the guide rail and is preferably a reduced radius horseshoe shape to avoid any chance of interfering with the operation of the belt. This support arrangement may be provided along either, or both sides of the guide rail, and has been found to add stability to the belt as it reverses direction around the drive/idler ends. As can be appreciated, the split sprocket and bushing allow for the components to be easily assembled or disassembled for easy maintenance. This feature further assists in avoiding any lengthy production downtime.

The narrow width of the chain allows for placement of several conveyors in a relatively tight spaced relationship. This advantageously enables the system to provide multiple lane flow, thereby allowing transported products to undergo either merging or separating movement that is a requirement in many production operations. Also, the addition of curves/bends or inclines allows product flow to be directed to different areas of the facility or around/above production machinery for optimizing the use of floor space.

In the preferred embodiment, an electric motor connected to a single drive shaft provides the driving force for the belt. As can be appreciated, where multiple lanes are in use, a single drive shaft connected to a single motor allows a series of belts to be gang driven. The system of the invention can be easily coupled with the necessary in-feed or out-feed conveyors to form the desired spreading or merging product flow.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention and, together with the description, serve to explain the principles of the invention. In the drawings:

FIG. 2 is an enlarged perspective view of an improved modular link for a narrow width conveyor chain, including inwardly projecting tabs that assist in guiding the belt along the guide rail and outwardly extending wing portions which provide increased surface area for retaining product on the belt;

FIG. 3 is an enlarged front view of a narrow width modular link in sliding engagement with the upper guide track (shown in cross-section) of the I-beam guide rail;

FIG. 4 is a side view of the means for driving the conveyor belt (shown in phantom) positioned adjacent an end of the guide rail, including the releasable split drive sprocket secured about the drive shaft;

FIG. 5 is a cross-sectional view of the preferred embodiment of the I-beam guide rail, including upper and lower pairs of flanges which form the integral guide tracks, the C-shaped reinforcement strip co-extruded with the guide rail, and spaced leg supports which attach to the web;

FIG. 5a is a side view of the integral I-beam guide rail shown along line 5a–5a of FIG. 5, including the molded plastic material cutaway to show the reinforcement strip and the bonding aperture;

FIG. 6 is a exploded view of the drive shaft bearing and support means, including the support plate having a centrally located notched aperture, a split bushing with opposed integral retainer tabs which correspond to the notches, and an E-shaped retainer clip for assisting in securing the halves of the bushing together;

FIG. 6a is a cross-sectional view along line 6a–6a of FIG. 4, further showing the support and bearing means disposed along both sides of the guide rail;

Reference will now be made in detail to the present preferred embodiment of the invention, an example of which is illustrated in the accompanying drawings.

DETAILED DESCRIPTION OF THE INVENTION

Figure 1:
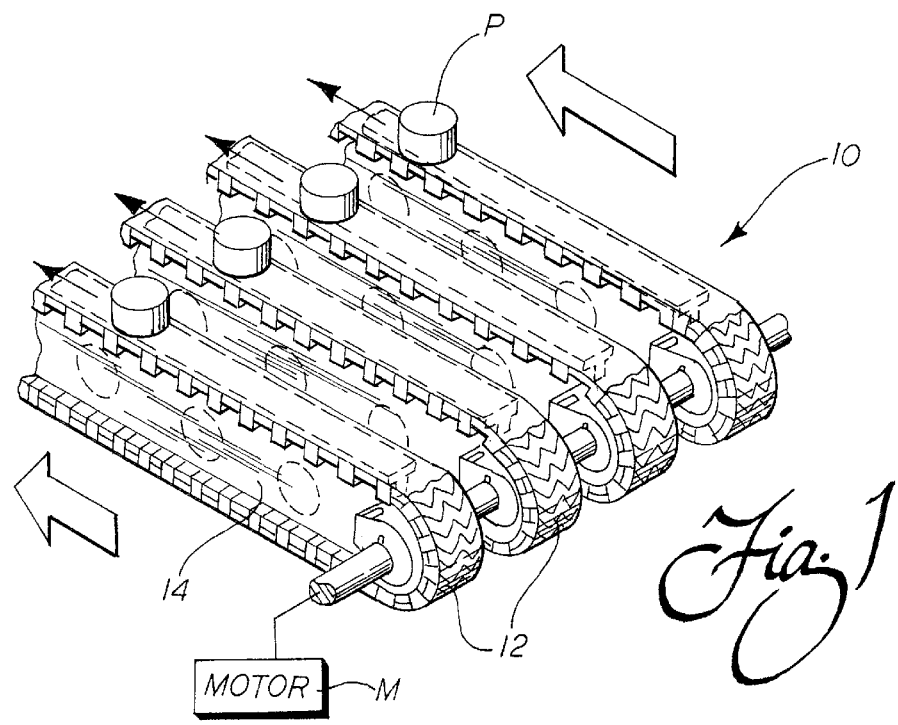
FIG. 1 is a perspective view of the modular link conveyor system of the present invention, including a series of narrow chain conveyor belts gang driven by a single drive shaft along I-beam shaped guide rails.
Figure 1A:
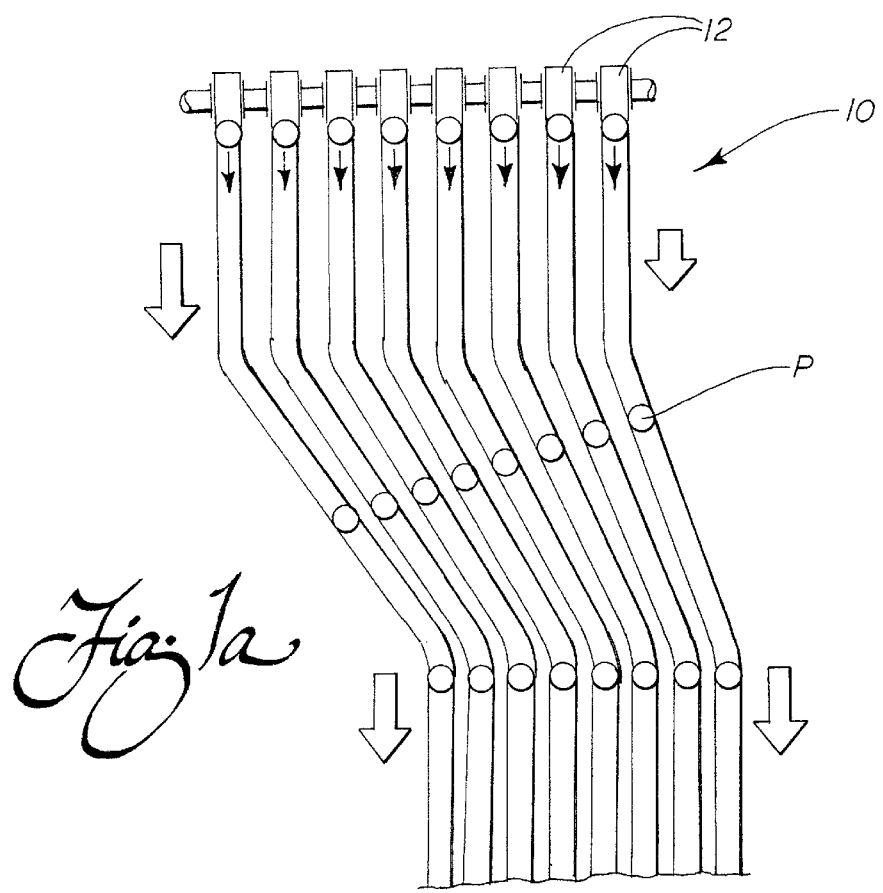
FIG. 1a is a schematic of the conveyor system having multiple lane product flow, including bends that allow for merging product flow.

Reference is now made to FIGS. 1 and 1a illustrating the narrow width chain conveyor system 10 of the present invention. Each conveyor of the system includes a modular link conveyor belt 12 and an I-beam shaped guide rail 14. As will become apparent after reviewing the description below, the narrow profile of these components allows a plurality of belts 12 to be placed in a tight spaced relationship and gang driven by a single drive shaft 16. This advantageously enables multiple lane flow, thereby allowing transported product P to undergo either merging (See FIG. 1a) or separating movement (not shown), which is a requirement in many production lines and operations.

More specifically, with reference to the schematic diagram of FIG. 1a, the addition of curves or bends in the guide rails 14 allow the system to change direction, and to "come together" from a series of relatively widely spaced belts 12 to a relatively close arrangement. This allows the product P being conveyed to "merge" with another production line originating from a different area of the production facility (not shown). The merging lines may be coupled to an appropriate out-feed conveyor (not shown) to transport the product P to additional work stations. Thus, another aspect of the significant improvement in space savings and production efficiency is realized. Of course, a similar arrangement where the belts "spread apart" to provide divergent flow is within the broadest aspects of the invention.

The endless conveyor belt 10 is formed by a plurality of interconnected single width modular links 18. A general description of the design and materials which form the links can be found in Applicant's issued U.S. Pat. Nos. 5,031,757, entitled "Modular Link Conveyor Chain System with Narrow Chain," and 4,953,693 entitled "Modular Link Conveyor System." The disclosures of these patents are incorporated herein by reference.

With reference now to FIG. 2, each link 18 includes an apex 20 and a pair of spaced legs 22 extending angularly outwardly therefrom. A bulb-like foot portion 24 is formed at the distal end of each leg 22. Each foot portion 24 includes a depending arm 26 having an inwardly projecting tab 28 which assists in guiding the conveyor belt 12 (see FIG. 3), as is described more fully below. A wing 30 may extend angularly outwardly from link 18 on each side. The wings 30 serve to increase the width of the belt 12 if desired, and thus provide a greater surface area for supporting slightly wider product. As can be appreciated from viewing FIG. 2, the links 18 have an open design that contributes to the easy cleaning capabilities.

In the preferred embodiment, the links 18 are formed of a high density plastic material, such as acetal. This provides a strong and durable link 18 having improved frictional characteristics, as described in more detail below. This material provides an FDA approved surface and further enhances easy cleaning, a feature of particular benefit in the food processing industry.

To interconnect the single links 18 together to form the belt 12, a plurality of single-width, transverse cross rods are provided (see rod 19 in FIG. 2). A transverse hole 32 is formed in each foot portion 24 in which the cross rod is force fit. Preferably, the rod is formed of stainless steel, and is knurled and sized for a force fit at the end locations where it passes through the hole 32 in order to ensure a secure engagement. To prevent the formation of a blind cavity wherein debris or residue can accumulate, the rod is ideally sized in length and assembled to be flush with the outside edge of each foot portion 24. However, depending on the width of the link 18 required for a particular operation, the rod may extend outwardly from each hole 34 and engage the auxiliary wing 30 to provide additional stability, as is described in more detail below.

Each cross rod 19 joins the foot portions 24 of a leading link with the apex portion 20 of a trailing link, thereby forming the endless, interlocking conveyor belt 12 having the width of a single link. More particularly, an elongate transverse slot 34a is formed in the apex 20 of link 18 for receiving the portion of the cross rod which extends between the foot portions 24 of a leading link. As can be appreciated, this slot 34a allows the cross rod 19 to shift longitudinally and pivot laterally, which provides the belt 12 with the ability to pivot in both the vertical and horizontal plane.

Specifically referring now to the horizontal plane, the movement of the apex 20 into the space between legs 22 allows the belt 12 to compress across its width. This allows the belt to smoothly and efficiently traverse curves or bends in the conveyor system 10. Moreover, the front side portions of each apex 20 are provided with slanted surfaces that enhance the ability of each link 18 to smoothly turn in the direction of the curve without interfering with the surrounding leg portions 22 of a leading link.

With regard to the vertical plane, the apex 20 of a trailing link is free to rotate about the cross rod 19. This provides the belt 12 with the ability to ramp upward or downward, as necessary. This maneuverability in both the horizontal and vertical planes allows the narrow width belt 12 to convey small articles, such as bakery muffins, cookies, crackers, or other small food products, in the reduced spaces available in many food processing lines.

For additional stability, each wing 30 is provided with the transverse slot 34b corresponding to slot 34a. This slot 34b is adapted to accept the extensions of the cross rod 19, if present, and provide additional lateral stability to the links 18. As can be appreciated, this arrangement retains the above-described pivotability and compressibility of the links for smoothly negotiating curves, while providing the belt 12 with an increased width for conveying slightly wider product.

Referring now to FIGS. 3, 4 and 5, the preferred embodiment of the guide rail 14 is shown and takes the form of an extruded, plastic I-beam. As an alternative, the I-beam can be formed by merging back-to-back C-shaped plastic channels (see dashed merging line 14' in FIG. 5). Lateral upper and lower opposed flanges provide integral guide tracks 40, 42, respectively, for guiding and supporting the conveyor belt 12. More specifically, as best shown in FIG. 3, the depending arms 26 of each link 18 slidingly engage the side edges of the upper guide track 40, thereby serving to guide the conveyor belt 12 along a forward run. The links 18 are vertically supported by the upper bearing surface of the track 40 (see FIG. 3).

The lower flanges act as a guide track 42 for the belt 12 hanging downwardly along a return run. More specifically, the inwardly projecting tabs 28 slidingly engage across the integral lower guide track 42 for support. The depending arms 26 slidingly engage the side edges in the same manner as the forward run. This arrangement for supporting the belt 12 as it hangs in an inverted position, thereby obviates the need for any additional support structure for the return run.

Referring now to FIG. 4, the means for driving the belt 12 are shown. A split sprocket 44 is secured about a shaft 46 to provide the driving force to the belt 12. An electrical motor/transmission M is provided to drive the shaft 46 (see FIG. 1). Typically, the shaft 46 supports multiple sprockets 46 for a gang of belts 12. The split sprocket 44 is formed of symmetrical halves, each having a pair of cooperating raised sockets 48 in which removable fasteners, such as screws, are inserted. The ends of the guide rail 14 are provided with a curved profile to allow the sprocket 44 to be positioned in close proximity to the upper and lower guide tracks 40, 42 to engage belt 12. The sprocket 44 is ideally formed of a lightweight, but durable, plastic material, such as a Nylon blend.

To provide for smooth belt transition around sprocket 44, a pair of curved guide track extensions 49 are provided (side view of one track shown in FIG. 4). Preferably, these extensions 49 cooperate to assist the belt 12 in negotiating the turns between the upper and lower guide tracks 40, 42. In a similar fashion to the positive guiding movement of the belt 12 along the guide tracks 40, 42, the depending arms 26 of each link 18 slidingly engage the outside edges of the extensions 49, while the inwardly projecting tabs 28 slidingly engage underneath them around the full turn. As can be appreciated, this engagement assists in providing smooth and efficient operation of the belt 12 as the transition is made from a return to the forward run, and vice versa.

As shown in FIGS. 5 and 5a, in the preferred embodiment, the I-beam guide rail 14 is extruded in integral, extended lengths. For long conveyor lines, the ends of the adjacent rails are connected in an abutting fashion with no gap. This provides smooth movement, as well as eliminates crevices where collection of deleterious debris could otherwise occur. The rail is preferably a plastic composition having enhanced tribological characteristics, such as UHMW plastic, including Nylon 6—6, or the like. The I-beam shape allows any product residue to be easily removed using conventional cleaning processes. For added strength, a C-shaped metal reinforcement strip 50 may be embedded in the guide rail 14 during the extrusion process. As can be seen in the cutaway side view provided by FIG. 5a, the reinforcement strip 50 is preferably provided with a series of apertures 52 (one shown in phantom) that allow the plastic material molded to either side of the guide rail 14 to, bond together. Horizontal or vertical curves (not shown) may also be formed during extrusion, thereby allowing a wide variety of degrees of curvature to be provided.

As is shown in FIG. 5, support means, such as spaced legs 54, adapted to be fixed to a pylon or the like, is provided for the conveyor system. The legs 54 extend outwardly from the sides of the guide rail 14 so as not to interfere with the operation of the belt 12.

For improving stability during operation of the system, end guide components are provided. As shown in the exploded view of FIG. 6, these components include a horseshoe-shaped plate 56 which houses a bearing surface for drive shaft 46. More particularly, a centrally-located aperture 58 in plate 56 allows shaft 46 to pass therethrough, and also serves to house a split bushing 60 that provides the bearing surface.

The bushing 60 is preferably provided in two symmetrical halves, each having a semi-circular inner surface, and is made from a durable plastic material having a high degree of lubricity, such as a UHMW Nylon 6—6 blend. To secure the bushing 60 in the aperture 58, a pair of opposed integral retainer tabs 62 are provided. The tabs 62 each correspond to notches 64 formed in aperture 58. Upon laterally inserting both tabs 62 through the notches 64, the upper and lower halves of the bushing 60 are urged in an upward or downward fashion, respectively, until secured in place about shaft 46. To prevent bushing 60 from dislodging from aperture 58, a resilient E-shaped retainer 66 is slidably forced into a groove 68 formed around the inner edge of bushing 60. A retaining lip 70 formed adjacent to the groove 62 prevents the retainer 66 from disengaging. As should be appreciated, the combined releasability of the split sprocket 44 and bushing 60 allow for easy assembly/disassembly, thereby avoiding any significant production downtime for maintenance or the like.

With reference now to FIGS. 4 and 6, the support plate 56 includes a pair of mounting apertures 72a which correspond to apertures 72b provided on both sides of the web of guide rail 14. Any suitable connectors, such as a threaded bolt/nut combination, may serve to attach the support plate 56. Threaded spacers (not shown) may be provided adjacent apertures 72b to ensure that the support plate 56 does not interfere with the operation of the sprocket 44 or belt 12.

As best shown by the cross-sectional view in FIG. 6a, it should be appreciated that the above-described support/bearing arrangement may be provided along both sides of the guide rail 14 for further improving system stability. Additionally, although shown for use with the drive shaft 46 and sprocket 44, a similar support arrangement may be provided for the idler shaft/sprocket at the opposite end of the endless conveyor (not shown).

During a forward run operation, the depending arms 26 serve to guide the belt 12 along the upper guide track 40, as described above. As best shown in FIG. 3, the underside of the apex 20, the legs 24, and a portion of each foot 24 all ride along the bearing surface provided by the track 40. Advantageously, a minimum amount of friction is created between the acetal surface of the links 18 and the UHMW plastic which forms the guide rail 14 of the preferred embodiment. This not only improves system efficiency, as less power is required to overcome frictional forces, but also reduces wear on the belt 12 and guide track 40. Further, it should be appreciated that the arms 26 and guide tabs 28 ride along the outside of the guide rail 14, where they can be easily inspected for wear and cleaned. Moreover, as briefly noted above, wings 30 do not contact the guide track 40 and, thus, provide additional surface area on belt 12 for transporting wider product, while the desired minimum frictional contact is maintained.

During the return run, the links are inverted and hanging downwardly from the guide track 42. Thus, there is no frictional engagement between the apex 20, legs 22, and foot portions 24 and the flat surface provided by the flanges of track 42. Rather, vertical contact occurs only with the inwardly projecting tabs 28, which advantageously serves to further reduce friction on the belt 12.

As the belt 12 leaves the return run, each modular link engages a tooth of sprocket 44 at the drive end of the system 10 and is driven upwardly to the forward run. The cross rods 19 allow for pivotal motion, thereby permitting trailing links to rotate and efficiently follow leading links. The curved guide track extensions 49 facilitate smooth operation as the belt 12 reverses direction about the sprocket 44 (see action arrow in FIG. 4).

Other possible modifications to the system include providing both sides of the modular links 18 with wing extensions 80 (shown on one side in phantom in FIG. 2). Such extensions 80 provide the belt 12 with an even greater product-retaining surface area, while avoiding the creation of any additional significant friction with guide tracks 40, 42. Still another modification includes attaching side rails (not shown) along the upper sides of the guide rail for assisting in holding product on the belt 12.

Figure 7:
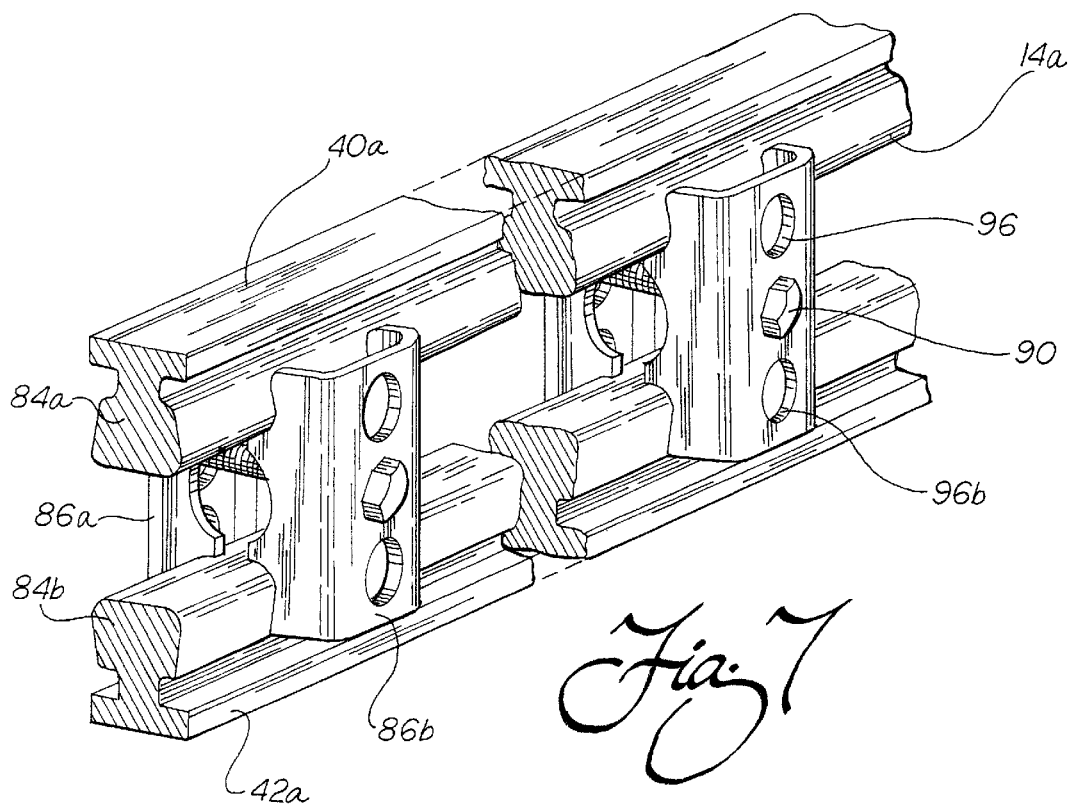
FIG. 7 is a perspective view of an alternate embodiment of the I-beam guide rail having integral upper and lower guide tracks and a plurality of clamp assemblies for securing the guide tracks in a spaced relationship.
Figure 7A:
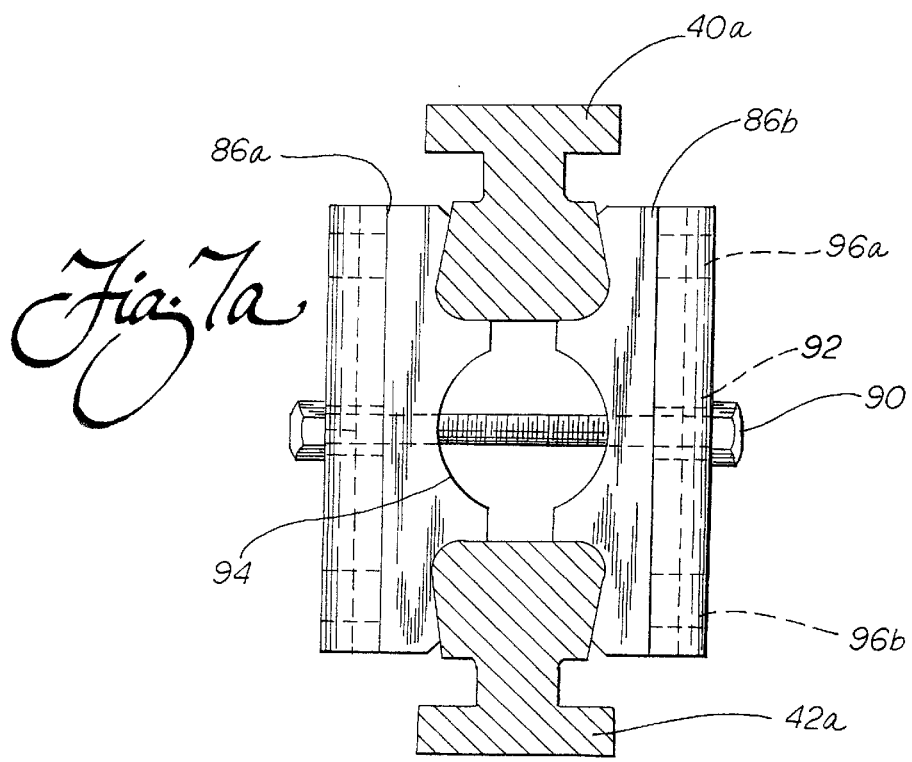
FIG. 7a is a cross-sectional view of the alternate embodiment shown in FIG. 7.

As shown in FIGS. 7 and 7a, an alternate embodiment of the upstanding I-beam guide rail 14a includes spaced integral upper and lower guide tracks 40a, 42a held together by a series of opposed clamp assemblies 82. Each respective guide track 40a, 42a includes the pair of opposed flanges that provide guide/bearing surfaces for the links 18, as described above in the preferred embodiment. Extending from each integral guide track 40a, 42a is an elongated bulbous protrusion which forms a pair of opposed shoulders. The clamp assemblies 82 include opposed brackets 86a, 86b, each having an identical, but mirror-image, contoured profile that serves to accept the shoulders (see FIG. 7a). Attachment means 90, such as a bolt/nut combination, secure the brackets 86a, 86b together through an centrally-located aperture 92.

The clamp assemblies 82 are placed along the length of the guide tracks 40a, 42a at spaced intervals, as necessary for support and stability. The profile of each bracket 86a, 86b may also include a semi-circular segment 94 designed to accept a longitudinally-extending support rod (not shown) for adding rigidity to the guide rail 14a, especially around curved sections.

The use of non-integral clamp assemblies 82 provides greater flexibility to the conveyor system by allowing the space between the guide tracks 40a, 42a to be adjusted by simply using longer or shorter brackets.

In summary, numerous benefits have been described which result from employing the concepts of the present invention. The conveyor system 10 includes an upstanding I-beam guide rail 14 for use with a narrow width modular link conveyor belt 12 (see FIG. 1). The belt 12 is formed from a series of modular links interconnected through an apex 20 and spaced legs 22. The legs 22 terminate in foot portions 24 having depending arms 26 with inwardly projecting guide tabs 28 for slidingly engaging integral outwardly extending upper and lower guide tracks 40, 42 (see FIGS. 2 and 3). These guide tracks 40, 42 may be incorporated into a single piece I-beam guide rail 14 (FIG. 5), or secured together in a spaced relationship using a series of clamping brackets 82 (FIGS. 7 and 7a). Additionally, each link 18 is provided with wings 30 which serve to increase the width of the belt for transporting wider product. A split sprocket 44 is releasably secured to the drive shaft 46 (see FIG. 4) and an idler shaft (not shown) for engaging the belt 12. Releasable end guide components, including a plate 48 which houses a split bushing 52, provide support and a bearing surface for these shafts (see FIGS. 6 and 6a). A series of narrow width chain conveyor belts positioned in a spaced relationship provide multiple lane product flow (see FIG. 1). Bends or curves formed in the guide rail 14 also allow for merging or separating flow among a plurality of belts 12 (see FIG. 1a).

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A conveyor system, including a modular link conveyor belt, comprising:

a plurality of integral modular links forming the conveyor belt, each of said links having opposed inwardly projecting guide tabs; and an upstanding I-beam conveyor guide rail having integral outwardly extending upper and lower guide tracks, said inwardly projecting guide tabs slidingly engaging said upper and lower guide tracks.

2. The conveyor system according to claim 1, wherein each of said plurality of modular links further comprise:

an apex portion having a slot passing transversely therethrough;

a pair of leg portions extending from said apex portion, each leg portion including a hole passing transversely therethrough and a depending arm which supports said inwardly projecting guide tab; and a plurality of transverse connecting means, said connecting means passing through said slot and said holes to engage said integral modular links together to form the conveyor belt.

3. The conveyor system according to claim 1, further including means for supporting said guide rail above a floor.

4. The conveyor system according to claim 1, wherein said upstanding I-beam guide rail is integrally formed.

5. The conveyor system according to claim 1, wherein each of said plurality of modular links further comprise:

an apex portion having a slot passing transversely therethrough;

a pair of leg portions extending from said apex portion, each of said leg portions further terminating in foot portions, each foot portion including a hole passing transversely therethrough and a depending arm which supports said inwardly projecting guide tab;

a wing extending outwardly from each of said leg portions, each wing including a slot passing transversely therethrough, said slot corresponding to said slot in said apex portion; and a plurality of transverse connecting means, said connecting means passing through said slots and said holes to engage said integral modular links together to form the conveyor belt.

6. The conveyor system according to claim 5, wherein each of said wings of said modular links include a wing extension, whereby the surface area of said modular links id further increased.

7. The conveyor system according to claim 1, further including means for transitioning the conveyor belt between said upper and lower guide tracks.

8. The conveyor system according to claim 7, wherein said transitioning means comprises a shaft and a split sprocket releasably secured to said shaft for engaging the conveyor belt at an end of said guide rail.

9. The conveyor system according to claim 8, further including means for rotatably supporting said shaft.

10. The conveyor system according to claim 9, wherein said support means are provided along both a first and second side of said guide rail.

11. The conveyor system according to claim 9, wherein said support means comprises:

a support plate extending longitudinally from an end of said guide rail, said plate having an aperture for allowing said shaft to pass therethrough;

a split bushing for securable attachment in the aperture in said support plate, said bushing providing a bearing surface for said shaft; and a retainer for securing said split bushing about said shaft.

12. The conveyor system according to claim 11, wherein said split bushing further includes a plurality of integral retainer tabs which cooperate with corresponding notches formed in the aperture in said support plate.

13. The conveyor system according to claim 12, wherein said shaft is driven by a drive means.

14. The conveyor system according to claim 1, wherein said upper and lower guide tracks are held in a spaced relationship by a plurality of clamping assemblies.

* * * * *